United States Patent
Ribet et al.

(10) Patent No.: US 10,330,155 B2
(45) Date of Patent: Jun. 25, 2019

(54) GREASE RETAINING AND OIL METERING DEVICE FOR A ROLLING BEARING UNIT

(71) Applicant: Aktiebolaget SKF, Gothenburg (SE)

(72) Inventors: Massimiliano Ribet, Pomaretto (IT); Giuseppe Guala, Pinerolo (IT)

(73) Assignee: Aktiebolaget SKF, Göteborg (SE)

(*) Notice: Subject to any disclaimer, the term of this patent is extended or adjusted under 35 U.S.C. 154(b) by 0 days.

(21) Appl. No.: 16/021,753

(22) Filed: Jun. 28, 2018

(65) Prior Publication Data
US 2019/0010988 A1    Jan. 10, 2019

(30) Foreign Application Priority Data
Jul. 7, 2017   (IT) .................. 102017000076753

(51) Int. Cl.
| | | |
|---|---|---|
| F16C 33/66 | (2006.01) | |
| F16C 41/04 | (2006.01) | |
| F16C 19/38 | (2006.01) | |
| F16C 33/58 | (2006.01) | |

(52) U.S. Cl.
CPC ........ F16C 33/6629 (2013.01); F16C 19/386 (2013.01); F16C 33/583 (2013.01); F16C 33/6614 (2013.01); F16C 33/6618 (2013.01); F16C 41/04 (2013.01); F16C 2226/74 (2013.01)

(58) Field of Classification Search
CPC ...... F16C 19/38; F16C 19/383; F16C 19/385; F16C 19/388; F16C 33/6614; F16C 33/6629; F16C 2226/74
See application file for complete search history.

(56) References Cited

U.S. PATENT DOCUMENTS

| | | | | |
|---|---|---|---|---|
| 5,803,616 A | * | 9/1998 | Persson ............... | F16C 33/6629 384/466 |
| 2016/0123398 A1 | * | 5/2016 | Holsnijders ......... | F16C 33/6611 384/469 |
| 2016/0138653 A1 | * | 5/2016 | Holsnijders ......... | F16C 33/6622 384/606 |

FOREIGN PATENT DOCUMENTS

| | | | |
|---|---|---|---|
| DE | 102008025568 A1 | * 12/2009 | ............ F16C 19/543 |
| JP | 6039431 B2 | * 12/2016 | .......... F16C 33/6629 |
| WO | 2016096918 A1 | 6/2016 | |

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing unit provided with a rolling bearing having a radially outer race, two radially inner races, a ring of conical rollers arranged between the radially outer race and the two radially inner races, and a device for retaining grease and metering oil housed inside a groove of the radially outer race and having an annular wall arranged transversely with respect to the rolling bearing and acting as barrier for the flow of grease and provided with a plurality of through-openings for retaining the grease and allowing the oil to pass between the two rings of conical rollers in any operating condition, and also with a plurality of radial vanes engaged with the annular wall for retaining the grease.

5 Claims, 2 Drawing Sheets

GREASE RETAINING AND OIL METERING DEVICE FOR A ROLLING BEARING UNIT

CROSS-REFERENCE

This application claims priority to Italian patent application no. 102017000076753 filed on Jul. 7, 2017, the contents of which are fully incorporated herein by reference.

TECHNOLOGICAL FIELD

The present invention relates a grease retaining and oil metering device for a rolling bearing.

The present invention also relates to a rolling bearing unit provided with a grease retaining and oil metering device, in particular, a conical roller bearing unit, which is referred to in the description below in a non-limiting manner.

BACKGROUND

Italian patent application TO2014A001045 discloses a rolling bearing unit comprising:
- a radially outer race which is stationary during use and has a central and circular groove on an inner surface thereof;
- two radially inner races which are rotatable during use;
- two rings of conical rollers arranged between the radially outer race and the two radially inner races; and
- a grease metering device housed inside the groove of the radially outer race and comprising, in turn, a radially outer ring on which at least one radially inner projection defined by a continuous vertical wall is engaged.

In the conical roller bearing unit of the type described above, the grease is introduced into the central zone situated between the two rings of conical rollers and, typically, types of oil-based soap-thickened grease, which has a good thermal, oxidation and mechanical stability as well as excellent water-resistance and anti-rust properties, are used. Therefore, the continuous vertical wall of the grease metering device has the function of creating a kind of obstacle to the free outflow of the grease, preventing possible migration of the grease from one ring to the other ring of conical rollers, in particular during transportation of the bearing unit, and allowing suitably controlled dispensing of the grease during operation of the bearing unit. However, with the grease metering devices of the known type, during the operating conditions of the bearing, it has been noted that the grease migrates between the various parts of the bearing unit in an entirely random manner, owing to various factors, most of which cannot be controlled, with the result that often some zones requiring more lubrication receive small amounts of grease and are subject to premature wear, while other zones requiring less lubrication receive too much grease, resulting in undesirable accumulations with a consequent increase in the leakages due to friction.

SUMMARY

The object of the present invention is to provide a grease retaining and oil metering device for a rolling bearing unit, which device is able to overcome the drawbacks of the known devices described above, ensuring—optionally also controlled—distribution of the grease inside the bearing unit without, however, allowing the migration of the grease from one ring to the other ring of conical rollers during transportation, i.e. hindering the free outflow of the grease, and at the same time releasing the oil therefrom in a controlled manner even in the absence of centrifugal force. This object and other objects and advantages, which will be understood more clearly below, are achieved with the present invention which provides a grease retaining and oil metering device for rolling bearings having the characteristic features mentioned in the accompanying claims.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
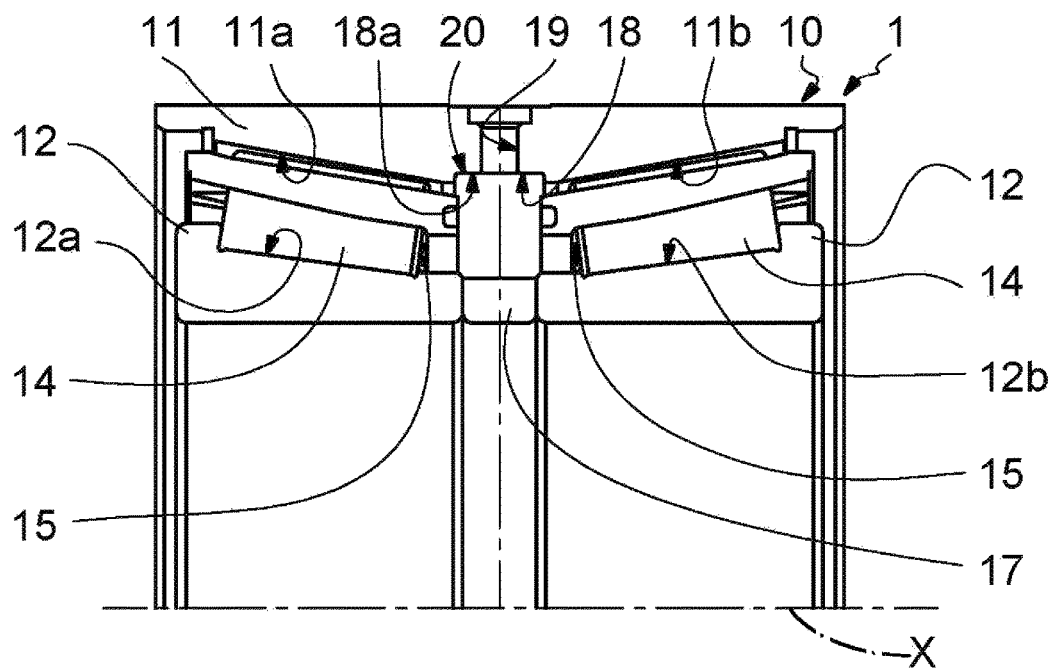
FIG. 1 is a schematic axially sectioned view of an embodiment of a grease retaining and oil metering device for rolling bearings according to the present invention.

With reference to FIG. 1, 1 denotes in its entirety a bearing unit with a central axis of rotation X and comprising a rolling bearing, denoted overall by 10. The present invention is particularly suitable for use in the railway sector where the rolling bearing units used are large in size with an internal hole having dimensions of between 90 and 160 mm. The present invention is, however, applicable in all the other technological sectors, other non-limiting examples of application being the motor vehicle sector or renewable energy sector.

In the whole of the present description and in the claims, the terms and expressions indicating positions and orientations such as "radial" and "axial" are understood as being in relation to the central rotation axis X of the bearing unit 1.

The bearing 10 comprises an outer race 11 which, during use, is stationary and has a pair of raceways 11a and 11b; and a pair of inner races 12 which, during use, are rotatable, have respective raceways 12a and 12b and are axially separated from each other by a spacer 17 axially arranged in between them; moreover, the outer race 11 has, in a radially outer position with respect to the central spacer 17, a central and circular groove 18 formed on an inner surface 11a of the radially outer race 11 and at least one through-seat or hole 19 formed along the central groove 18.

The bearing 10 furthermore comprises, for each inner race 12, a ring of rolling members 14, in this example conical rollers, arranged between the outer race 11 and the associated inner race 12 inside the raceways 11a, 12a and 11b, 12b, respectively; and a retaining cage 15 for keeping the conical rollers 14 angularly spaced from each other about the axis X. Considering that, in the example of embodiment of the invention described here, the rolling members 14 are defined by conical rollers, the raceways 11a and 11b as well as the raceways 12a and 12b are conical surfaces, the generating lines of which converge towards the axis X; In particular, the generating lines of the raceways 11a and 12a converge in the opposite direction to the generating lines of the raceways 11b and 12b, and all the generating lines converge substantially towards a center plane of the bearing 1 transverse to the axis X and passing through the spacer 17.

Figure 3:
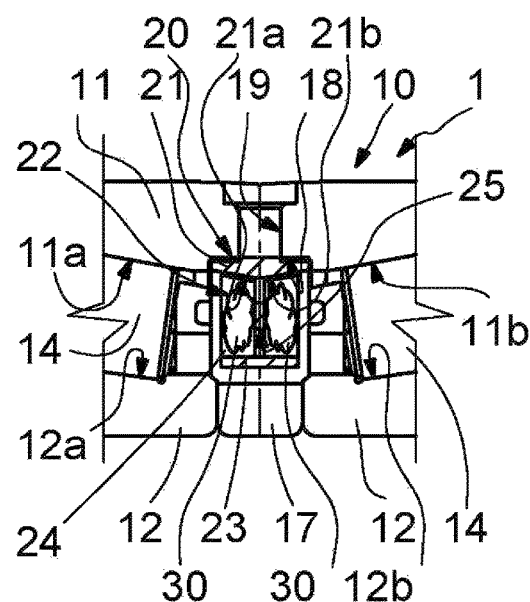

As also shown in FIG. 3, for the purposes of lubricating and reducing the friction between conical rollers 14, raceways 11a, 11b, 12a, 12b and cages 15, oil-based soap-thickened grease 30 is inserted in a central zone situated between the two rings of conical rollers 14 of the bearing unit 1 described above, and, for the purposes of optimum distribution both of the grease 30 and of its oil, schematically indicated by 31 in the figure, inside the bearing unit 1, the latter comprises finally a device 20 for retaining grease 30 (FIG. 3) and metering oil 31. The device 20 is housed inside the groove 18 of the outer race 11 in an intermediate position arranged between the two rings of conical rollers 14 so as to prevent the migration of the grease 30 from one ring of conical rollers 14 to the other ring and provide further support for the grease 30 both when the bearing unit 1 is transported with its axis X in a vertical position and in normal operating conditions of the bearing unit 1. In particular, the device 20 according to the present invention performs in an optimum manner its functions both during transportation of the bearing unit 1, acting as a barrier which is impermeable to the grease 30 and preventing in fact any migration of the grease 30 between the two rings of conical rollers 14, in particular when the bearing unit 1 is transported with its axis X in the vertical position and during operation of the bearing unit 1, retaining within it the grease 30 in the zone situated between the two rings of conical rollers 14, i.e. preventing uncontrolled dispersion of the grease 30 inside the bearing 10, while improving the durability and reliability of the bearing 10.

Figure 2:
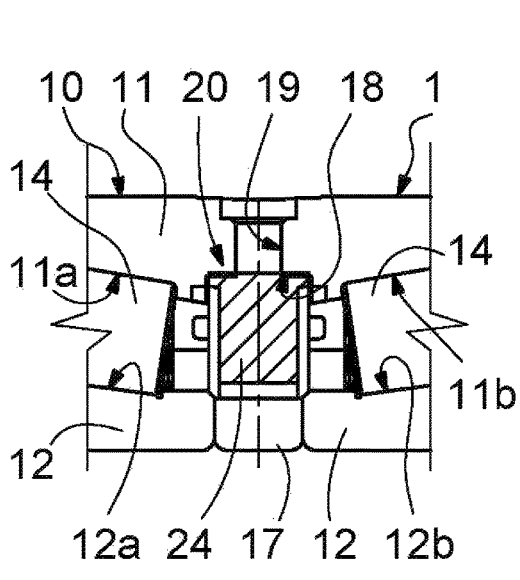
FIGS. 2 and 3 are two cross-sectioned views of corresponding details of the grease retaining and metering device shown in FIG. 1.
Figure 4:
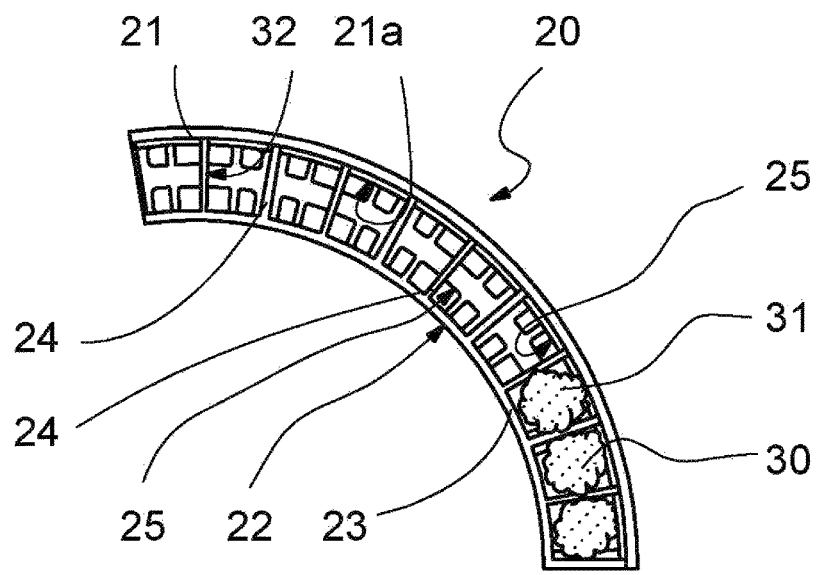
FIG. 4 shows, in schematic form and with parts removed for greater clarity, a side elevation view of the grease retaining and metering device shown in FIG. 1.

According to that shown more clearly in FIGS. 2, 3 and 4, the device 20 comprises a radially outer ring 21 arranged, as will be explained more fully below, inside the groove 18 and a radially inner projection 22 which, in the example of embodiment of the invention described here, is defined by an annular wall 22 arranged transversely with respect to the axis of rotation X and is engaged in the radially outer ring 21, acting as a barrier to the flow of grease 30 from one ring of conical rollers 14 to the other one. The device 20 further comprises a radially inner ring 23 engaged in the annular wall 22 radially on the opposite side to the radially outer ring 21 and arranged facing the spacer 17 and radially spaced from the spacer 17.

The radially outer ring 21 is internally bounded towards the annular wall 22 by two frustoconical surfaces 21a and 21b which have inclinations opposite to each other, but are inclined in the same direction as the raceways 11a and 11b towards which they are oriented. If the two surfaces 21a and 21b of the radially outer ring 21 form a guide surface for the oil 31 so that it migrates towards the raceways 11a and 11b of the outer race 11 of the bearing 10, the substantially flat form of the radially inner ring 23 has the function of retaining the grease 30 and preventing the grease 30 from falling onto the central spacer 17 and at the same time helps direct the oil 31 of the grease 30 towards the conical rollers 14, underneath the cages 15, or between the cages 15 and the races 12.

In order to increase further the number of surfaces for retaining the grease 30, so as to prevent dispersion of the grease inside the bearing 10 without varying the effectiveness of metering, the device 20 comprises finally a plurality of radial vanes 24 which extend in the radial direction from the radially outer ring 21 to the radially inner ring 23, are transverse and rigidly connected to the annular wall 22 and are arranged on both the axial sides of the annular wall 22.

Since the function of the annular wall 22 is mainly that of preventing migration of the grease 30 from one ring of conical rollers 14 to the other one, as well as providing a support for the grease 30, in particular when the bearing unit 1 is transported with its axis X in a vertical position, it is in any case necessary for the purposes of correct lubrication of the bearing 1 to allow the oil 31 of the grease 30 to circulate in some way inside the bearing 10 also between one ring of conical rollers 14 and the other ring: therefore, for this purpose, the annular wall 22 is provided with a plurality of through-openings 25 which are smaller in size than a droplet of grease 30, but bigger than a droplet of oil, such as to block the grease 30 on the two opposite axial sides of the annular wall 22, but allow the migration of the oil from one ring of conical rollers 14 to the other one.

The through-openings 25 are uniformly distributed around the axis X along two concentric circumferences with diameters different from each other and, although they connect together the zones of the two rings of conical rollers 14, they do not influence the necessary capacity of the annular wall 22 to stop the migration of the grease 30, promoting even further the characteristics of the device 20 in both its functions, i.e. that of retaining the grease 30 in zones where it must remain and that of metering the oil 31 of the grease 30.

In other words, the radial vanes 24 define, together with the radially outer ring 21 and the radially inner ring 23, a plurality of cells 32 for treatment of the grease 30, inside which each pair of radial vanes 24 diverges radially outwards and which are axially open on both sides, i.e. are axially open on each ring of conical rollers 14. The treatment cells 32 are divided into two axial halves which are substantially identical to each other along their axial center line by the annular wall 22. Each cell 32 cooperates with the adjacent cells 32, which are distributed around the axis X, so as to increase the capacity of the device 20 to retain the grease 30 between the two rings of conical rollers 14, increasing the contact surface between device 20 and grease 30, namely the surface able to support—or provide support for—the grease 30 in all the operating conditions.

Merely by way of an example which is not limiting in any way, in the retaining device 20 according to the present invention, taking into account also the fact that the physical characteristics of the grease 30 and the oil 31 may vary significantly with a variation in the operating temperature, it is preferable to have a density of four openings 25 every 200 mm2 together with a coverage equivalent to 48-50% of each cell 32. Moreover, with such a density and coverage, assuming an operating temperature in the region of 60° C., it is preferable to use a grease 30 having a consistency of between 1.5 and 3 NLGI and an oil 31 with a viscosity of between 40 and 220 cSt at 40° C. With these values provided by way of example, the retaining device 20 performs its functions of retaining the grease 30 and distributing the oil 31 in an optimum manner in particular during use of the bearing unit 1 and, therefore, even more so, during transportation of the bearing unit 1, namely with temperatures close to the ambient temperatures where the grease 30 has a greater viscosity which, as a result of the density of the openings 25 and their coverage, makes migration between the two rings of conical rollers 14 practically impossible.

Moreover, owing to the increase in the support surfaces due to the presence of the radial vanes 24, the grease 30 is accumulated inside the device 20 with greater efficiency and, since it is divided up into small amounts inside the cells 32, the formation of an amorphous mass which is particularly affected by the movements of the bearing 10 is avoided: these small amounts are not only less affected by the force of gravity, but also by the centrifugal force exerted by the bearing 10 during its operating conditions. At the same time, moreover, each cell 32 allows the oil 31 of the grease 30 to be uniformly distributed inside the bearing 10, improving its performance and wear resistance, and allows it to migrate from one ring of conical rollers 14 to the other one via the openings 25 provided in the annular wall portion 22. Again owing to the presence of the openings 25, the oil 31 may migrate from one ring of conical rollers 14 to the other ring, favoring the lubrication of the bearing 10 even in the case of seizing of one ring of conical rollers 14 of the two rings of conical rollers 14 and, in this case, the oil 31 of the grease 30 arranged in the cells 32 on the opposite side to the ring of conical rollers 14 which has seized tends to be recalled towards this ring of conical rollers 14, helping it to recover its functionality.

As already mentioned above, the radially outer ring 21 of the device 20 is arranged inside the groove 18, or more specifically is snap-engaged inside the groove 18 and, according to the invention, is designed with a diameter Φ1 larger in size than an outer diameter Φ2 of the groove 18. In fact, the radially outer ring 21 is flexible and may be substantially compressed so as to be inserted inside the groove 18 and left to snap back into position inside the groove 18. The elasticity of the material from which the radially outer ring 21 and preferably, but not necessarily, the entire device 20 is made will cause expansion of the radially outer ring 21 against the groove 18 of the outer race 11, ensuring, during use, a radial pressure on an end wall 18a of the groove 18.

Figure 5:
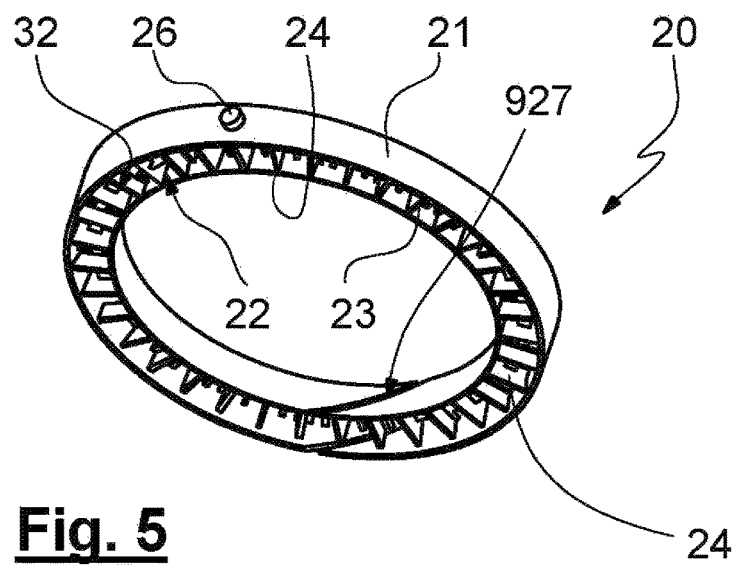
FIG. 5 shows a perspective and again schematic view of a further detail of the grease retaining and oil metering device shown in FIG. 1.

In accordance with that shown more clearly in detail in FIG. 5, in order to facilitate further the snap-engagement of the device 20 inside the groove 18, the device 20 has a structural discontinuity, namely an oblique incision 27 in its cross-section, which is formed in both the radially outer ring 21 and the radially inner ring 23 as well as the annular wall 22 and, by interrupting the structural continuity thereof, provides the device 20 with a greater deformation capacity when it must be inserted inside the groove 18.

The radially outer ring 21 has a thickness S which is axially not uniform and increases on both the axially opposite sides towards its centre line, and this thickness S, as well as the incision 27 are parameters, to be defined during the design stage, which are important for determining the deformation capacity of the device 20 and also for determining the subsequent sealing capacity of the device 20 once it is mounted inside the groove 18. Preferably, but not necessarily, the thickness S may be between 1 mm and 10 mm, while the incision 27, in addition to extending diagonally relative to the axis X, will have a width preferably smaller than 20 mm.

Finally, in order to prevent relative movements of the device 20 and the outer race 11, the device 20 has at least one radial projection 26 which is formed on the radially outer ring 21 and engages inside the seat 19 of the radially outer race 11. In the example of embodiment of the invention shown in the attached figures, a single radial projection 26 is shown, but, as required, the device 20 may be provided with several radial projections 26 distributed around the axis X and engaged inside a corresponding number of seats 19.

With use of the device 20 for retaining grease 30 and metering oil described above—referred to as a grease retaining and oil metering device—the following advantages may be obtained: possibility of introducing a greater amount of grease into the central zone of the bearing since the device offers a greater grease retention capacity and stability, in response to loads, vibrations and heat during the working life of the bearing, limiting the migration of the grease if the bearing unit is transported with its axis vertical; the oil of the grease in the device will be released into the bearing in a more controlled manner, allowing efficient lubrication for a longer period of time and consequently increasing the programmed maintenance intervals for the bearing.

Furthermore, although the retaining and metering device has been shown in combination with a conical roller bearing, the same device, according to the present invention, may also be used with other different types of bearing. More generally, it is understood that the invention is not limited to the embodiments described and illustrated here, which are to be regarded as examples of the unit; persons skilled in the art may be able to make various changes to the functions and the configuration of the elements described in the example of embodiment, without departing from the scope of the invention as defined in the accompanying claims and in the equivalents thereof.

What is claimed is:

1. A bearing unit including a rolling bearing, comprising:
   a stationary radially outer race having a central and circular groove formed on an inner surface of the radially outer race;
   two rotatable radially inner races;
   two rings having rolling members arranged between the radially outer race and the two radially inner races; and
   a retaining and metering device for retaining grease and metering oil that is housed inside the groove of the radially outer race and comprises a radially outer ring disposed inside the groove and a radially inner projection defined by an annular wall transversely oriented with respect to an axis of rotation of the rolling bearing and engaged inside the radially outer ring acting as a barrier for the flow of grease;
   the bearing unit comprises, in combination:
   a plurality of through-openings formed in the annular wall of the radially inner projection for retaining the grease and allowing the oil to pass between the two rings of rolling members in any operating condition, namely both during transportation and during operation; and
   a plurality of radial vanes engaged with the annular wall of the retaining and metering device for retaining the grease.

2. The bearing unit according to claim 1, wherein the radially outer ring can be snap-engaged inside the groove and has a diameter larger in size than a diameter of the groove.

3. The bearing unit according to claim 2, wherein the radially outer ring has a discontinuity for allowing snap-engagement inside the groove of the retaining and metering device.

4. The bearing unit according to claim 1, wherein the retaining and metering device further comprises a radially inner ring engaged with the radially inner projection.

5. The bearing unit according to claim 1, wherein the retaining and metering device has at least one radial projection formed on the radially outer ring to engage inside a respective seat of the radially outer race.

* * * * *